(12) United States Patent
Roepke

(10) Patent No.: US 7,075,258 B2
(45) Date of Patent: Jul. 11, 2006

(54) POWER CONTROL DEVICE OF AN ELECTRIC TOOL, A METHOD OF POWER CONTROL OF AN ELECTRIC TOOL AND AN ELECTRIC TOOL PROVIDED WITH A POWER CONTROL DEVICE

(75) Inventor: Stefan Roepke, Schwabmuenchen (DE)

(73) Assignee: Robert Bosch GmbH, Stuttgart (DE)

( * ) Notice: Subject to any disclaimer, the term of this patent is extended or adjusted under 35 U.S.C. 154(b) by 21 days.

(21) Appl. No.: 10/936,063

(22) Filed: Sep. 8, 2004

(65) Prior Publication Data

US 2005/0057211 A1    Mar. 17, 2005

(30) Foreign Application Priority Data

Sep. 11, 2003   (DE) ................. 103 42 232

(51) Int. Cl.
*H02P 7/00*   (2006.01)

(52) U.S. Cl. .................. 318/432; 388/907.5; 388/937; 388/904; 318/434

(58) Field of Classification Search ........... 318/432, 318/434, 811, 798; 388/907.5, 930, 904, 388/918, 937
See application file for complete search history.

(56) References Cited

U.S. PATENT DOCUMENTS

| | | | | |
|---|---|---|---|---|
| 5,014,793 A | * | 5/1991 | Germanton et al. | 173/181 |
| 5,154,242 A | * | 10/1992 | Soshin et al. | 173/178 |
| 5,868,208 A | * | 2/1999 | Peisert et al. | 173/178 |
| 6,424,799 B1 | * | 7/2002 | Gilmore | 388/811 |
| 6,430,463 B1 | * | 8/2002 | Lysaght | 700/168 |
| 6,696,814 B1 | * | 2/2004 | Henderson et al. | 318/811 |
| 6,705,408 B1 | * | 3/2004 | Kim et al. | 173/114 |

FOREIGN PATENT DOCUMENTS

EP    0 413 966 A2    2/1991
JP    2-280671    11/1990

OTHER PUBLICATIONS

Patent Asbtracts of Japan JP 2003309993A, Oct. 31, 2003.
Patent Abstracts of Japan JP 2002325472 A Nov. 8, 2002.

* cited by examiner

*Primary Examiner*—Rina Duda
(74) *Attorney, Agent, or Firm*—Michael J. Striker

(57) ABSTRACT

A power control device of an electric tool has a control or regulating device for adjusting a power output to an electric motor of the electric tool by means of a pulse width modulation, and a frequency transmitter that varies a frequency of the pulse width modulation in dependence on a required power output; also a method for power control in an electric tool, as well as an electric tool with a power control device are provided as well.

23 Claims, 1 Drawing Sheet

POWER CONTROL DEVICE OF AN ELECTRIC TOOL, A METHOD OF POWER CONTROL OF AN ELECTRIC TOOL AND AN ELECTRIC TOOL PROVIDED WITH A POWER CONTROL DEVICE

BACKGROUND OF THE INVENTION

The present invention relates to a power control device of an electric tool, a method for power control of an electric tool, and an electric tool provided with a power control device.

Power control devices of the above mentioned general type are known in the art. They are used for supplying a variable power from an energy source of an electric tool (for example an electric grid connection or an accumulator) to an electric motor of an electric tool. It is known to perform the control of the power by means of a pulse width modulation, or in other words to supply the power of the energy source not permanently, but instead in a pulsed fashion to the electric motor. Depending on the pulse width, the electric motor is set to make available an efficient power: when the pulse width amounts for example to 25% of the period provided by the frequency of the pulse width modulation, only approximately 25% of the maximum possible power is transmitted from the energy source to the electric motor.

The operation of a power control device with a pulse width modulation at a frequency of for example 5 kHz makes it acoustically recognizable by high frequency noise, similar to a whistle. In particular at low rotary speeds of the electric motor, for example during starting of the motor, this noise is significantly hearable and taken by users of the electric tool as disturbing.

From the prior art it is known to increase the frequency of the pulse width modulation, for example to 10 kHz so that the noise is located in a frequency region which is less hearable for the human hearing and can be heard as less disturbing. The increased frequency however leads to the situation that the losses in the transistor producing the pulse of the pulse width modulation, for example a MOSFET, increases. The undesired, additional losses require a transistor with high power data, which leads to a significant cost of the transistor-and thereby of the power control device.

SUMMARY OF THE INVENTION

Accordingly, it is an object of the present invention to provide a power control device for an electric motor, which avoids the disadvantages of the prior art.

More particularly, it is an object of the present invention to provide a power control device for an electric motor, in which the noise audioable in particular at low rotary speeds can be avoided with low structural expenses. In addition, a qualitative high-grade impression of the electric tool is provided.

Since the power control device has a frequency transmitter which varies the frequency of the pulse width modulation depending on the required power output, the operation of the power control device can be determined for different operational points or regions. In other words, depending on the required power output the noise generation and/or power losses can be reduced. For example it is possible at a low power demand corresponding to a low rotary speed of the electric motor, to select a high frequency of the pulse width modulation, since thereby the above mentioned noise generation (the whistling) can be reduced or avoided or eliminated, and therefore, because of the short pulse width in this operational condition, no high losses occur. On the other hand, with a high power demand and corresponding high rotary speed, the frequency of the pulse width modulation can be reduced, to reduce the losses of the transistor (for example turning on and turning off losses). Because of the operational noise of the electric tool which is generally produced in this operational condition, the suppression of the noise produced by the pulse width modulation is however difficult.

It should be mentioned that the term the "power control" used in this application, is manifested by the voltage signal formed with the pulse width modulation. For producing voltage pulses, an effective average voltage is generated, which in accordance with the electrotechnical model, depending on its height, determines the rotary speed of the electric motor. In the technical reality, with increasing voltage, also the increasing power consumption of the electric motor is observed; this alone because of the mechanical and electrical parasitic effects. In particular in the operational use of the electric tool (loaded condition) when the electric motor is supplied with a current with maximum permissible current intensity, there is a direct relationship between the average voltage and the power output. For the sake of a uniform identification in this application the terms "power output" and "power control device" are in the foreground.

It should be mentioned that the inventive power control device can be also a rotary speed control device, since there is a relationship between the power output of the electric motor and the rotary speed of the electric motor. In other words, for constant operational conditions, with increased power output an increase of the rotary speed of the electrical motor is produced, and with low power output reduction of the rotary speed is produced. The power demand or the rotary speed demand can be predetermined by the user of the electric tool, for example by a manually-operational operating element of the electric tool, and also can be supported or carried out by an electronic control or regulation of the electric tool.

In accordance with a further embodiment of the present invention, the dependence is a mathematically describable function, that has an input value corresponding to the required power output and an output value corresponding to a frequency of the pulse width modulation. Thereby the interaction between the required power at a frequency of the pulse width modulation can be described in a determined form. Preferably, the region of the selected power output, for example 0 to 200 V, is represented for example by a corresponding region of input voltage values, for example 0 to 2 W, while the region of the associate frequencies for example by 10 kHz to 3 kHz is represented by a corresponding region of output voltage values, for example 3 to 1 V volt.

Preferably, the function is a jump function. With a jump function for input values under a threshold value a first output value is provided, and above this threshold input value a second output value is provided. Such a jump function can be realized with a simple and cost favorable circuitry.

In accordance with a preferable embodiment of the present invention, the function is a step function. A step function has several regions of input values. A fixed output value is associated with all input values of one region, and the output values for two neighboring regions intersect one another. Thereby precise settings can be defined, in accordance with which frequencies determined for certain regions of the required power output are provided for the pulse width modulation.

It is advantageous when the function is a continuous function, in particular a linear function. Thereby an adaptation of the frequency can be provided steplessly depending on the required power output. This prevents discontinuous transitions during the frequency exchange. Thereby a generally comparable operation of the electric tool is provided.

Preferably the function is a monotonously falling function. This means that with increasing required power output, the frequency of the pulse width modulation is reduced. Thereby with lower power requirements, correspondingly a lower rotary speed, a high frequency is used to minimize the noise produced by the application of the pulse width modulation, while with higher power demand, correspondingly a higher rotary speed, a lower frequency is used to maintain the losses of the transistor as low as possible.

A preferable embodiment is provided when the association between input values and output values is stored as at least one value table or at least one characteristic field in a storage, or is determined by a logic device.

The present invention further also deals with a method of power control in an electric tool. In the inventive method the power output on an electric motor of the electric tool is controlled or regulated by a pulse width modulating procedure, and the frequency of the pulse width modulating procedure is varied depending on the required power output.

Finally, the present invention also deals with an electric tool with a power control device described herein above.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
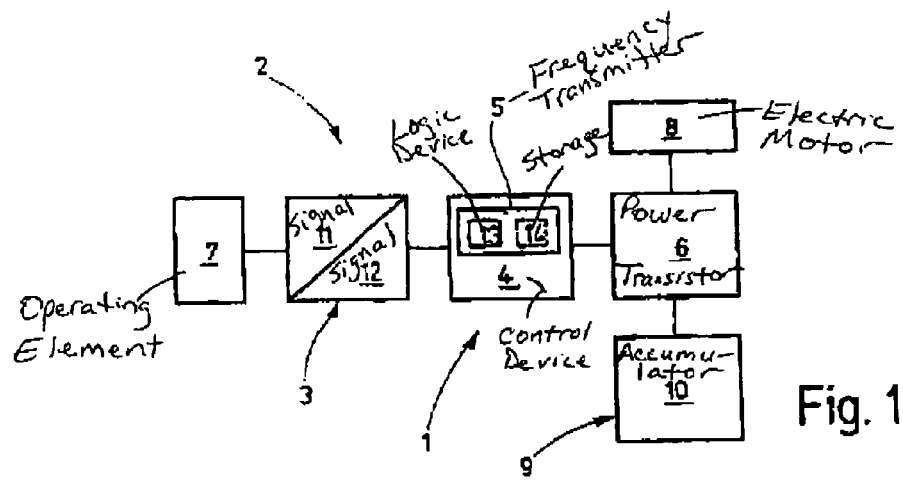
FIG. 1 is a view showing a functional diagram of an inventive power control device in an electric tool in accordance with the present invention.

FIG. 1 shows a power control device 1 in an electric tool 2. The power control device includes a convertor 3, a control device 4, a frequency transmitter 5, and a power transistor 6.

The input side of the convertor 3 is connected with an operating element 7 of the electric tool 2. The user of the electric tool 2 can adjust, by means of the operating element 7, the power output of an electric motor 8 of the electric tool 2 which is connected with the power transistor 6. The power transistor 6 is further connected-to an energy source 9. The energy source here is formed as an accumulator 10 of the electric tool 2. It provides power which is required for operation of the electric motor 8. The following operation is carried out in accordance with the present invention:

The activation of the operating element 7 by the user is taken by the convertor 3. For example in a variable speed regulator a pressing path of the regulator is detected by a path receiver, for example in the embodiment of a resistance potentiometer. The convertor 3 converts the mechanical movement of the operating element 7 into an analog or digital signal 12. After this the required power output/rotary speed is provided as the signal 12 and further supplied to the control device 4. Here the parameters of the pulses to be produced are determined, for activating the required power output from the accumulator 10 to the electric motor 8 or adjusting the required rotary speed of the electric motor 8. The pulse width and the frequency of the pulse are calculated for the parameters of the pulse to be produced. The frequency of the pulse is determined by the frequency transmitter 5 by means of the logic device 13. The control device 4 generates a signal sequence with which the power transistor 6 is turned on or turned off, for providing the pulse width modulated control of the electric motor 8.

Further embodiments of the power control device 1 can include for example a switch between the accumulator 10 and the power transistor 6, that is closed when an actuation of the actuating element 7 takes place. Thereby the electric tool 2 is turned off when the actuating element 7 is not activated. Further, a direct connection between the accumulator 10 and the electric motor 8 is provided when by the activation of the operating element it is indicated, for example by a maximum through pressing of a variable speed regulator, that a maximum power output of the accumulator 10 to the electric motor 8 is desired. Thereby in the case of maximum power demand the power transistor 6 is circumvented and losses in the power transistor 6 are avoided. It is also possible to provide the storage 14, in which the dependency between the required power output and frequency of the pulse width modulation is stored as a value table or a characteristic field.

Figure 2:
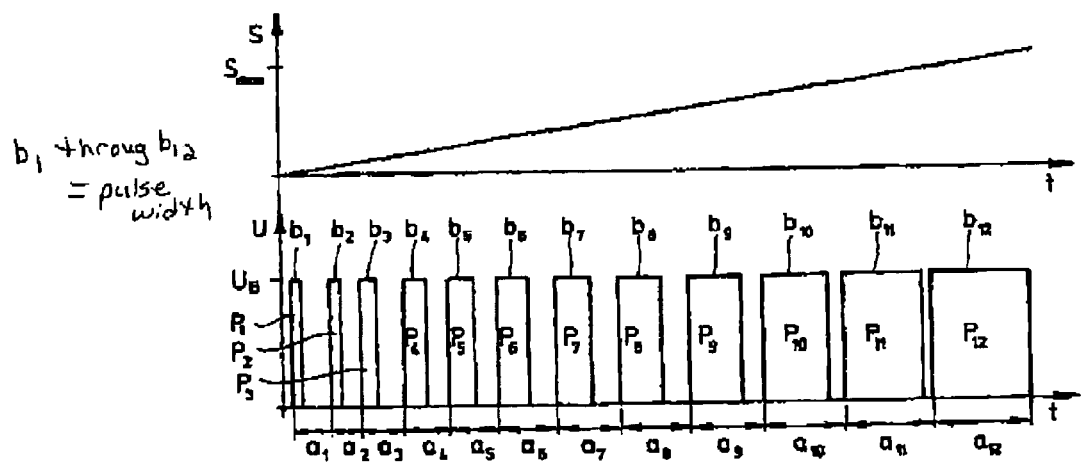
FIG. 2 is a view showing an example of a dependency between a required power output and a resulting pulse width modulated signal.

FIG. 2 shows an example of the relationship between the activation of the operating element 7 along a pressing paths up to a maximum value $s_{max}$ and a voltage pulses $P_1$ to $P_{12}$ with the amplitude $U_B$, which by turning on and turning off of the power transistor 6 activated by the control device 4 supplies the required power to the electric motor 8. Both the pressing path S and the voltage U are plotted along an axis of the time t. An activation of the operating element 7 takes place when the operating element 7 with progressing time t is always pressed through.

From the diagram of the voltage U, with consideration in direction of the increasing time t it can be recognized that on the one hand the pulse width $b_1$ to $b_{12}$ of the pulses $P_1$ to $P_{12}$ relative to periods a to $a_{12}$ of the pulses $p_1$ to $p_{12}$ increases, and in addition the period $a_1$ to $a_{12}$ is increased by a reduction of the frequency. Since the areas of the pulse $P_1$ to $P_2$ are proportional to the power output to the electric motor 8, it can be clearly seen that with a progressing time—and progressing pressing through of the operating element 7—always more power is supplied to the electric motor 8. In the beginning a small period $a_1$ (a high frequency) is selected to reduce the probability of the noise generated during the pulse width modulation. With increasing power demand the period is increased (the frequency is reduced, for example to 3 kHz), to reduce the noise generated in the power transistor 6. In addition to the reduction or avoidance of the above mentioned noise, due to the reduction of the maximum loss value of the power transistor 6 also a cost saving is obtained because of the possible utilization of a power transistor 6 with a lower power.

It will be understood that each of the elements described above, or two or more together, may also find a useful application in other types of constructions and methods differing from the types described above.

While the invention has been illustrated and described as embodied in a power control device of an electric tool, a method of power control of an electric tool and an electric tool provided with a power control device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A power control device of an electric tool, comprising a control or regulating device for adjusting a power output to an electric motor of the electric tool by means of a pulse width modulation; and a frequency transmitter that varies a frequency of the pulse width modulation in dependence on a required power output, wherein as the required power output increases, the frequency of the pulse width modulation decreases and a ratio of the pulse width to a period of the pulses increases.

2. A power control as defined in claim 1, wherein the dependency is a mathematically described function which has an input value corresponding to a required power output and an output value corresponding to a frequency of the pulse width modulation.

3. A power control device as defined in claim 2, wherein the function is a jump function.

4. A power control device as defined in claim 2, wherein the function is a step function.

5. A power control device as defined in claim 2, wherein the function is a continuous function.

6. A power control device as defined in claim 5, wherein said continuous function is a linear function.

7. A power control device as defined in claim 2, wherein said function is a monotonously falling function.

8. A power control device as defined in claim 2; and further comprising a value table in which a relationship between the input values and the output values is stored as at least one value table.

9. A power control device as defined in claim 2; and further comprising a storage in which a relationship between the input values and the output values is stored as at least one value table.

10. A power control device as defined in claim 2; and further comprising a storage in which a relationship between the input values and the output values is stored as at least one characteristic field.

11. A power control device as defined in claim 10; and further comprising a logic device in which a relationship between the input values and the output values is determined.

12. A method of power control in an electric tool, comprising the steps of controlling or regulating a power output to an electric motor of the electric tool by means of a pulse width modulated procedure; and varying a frequency of the pulse width modulated procedure in dependence on a required power output, wherein as the required power output increases, the frequency of the pulse width modulation decreases and a ratio of the pulse width to a period of the pulses increases.

13. A method as defined in claim 12; wherein the dependency is a mathematically described function which has an input value corresponding to a required power output and an output value corresponding to a frequency of the pulse width modulation.

14. A method as defined in claim 13, wherein the function is a jump function.

15. A method as defined in claim 13, wherein the function is a step function.

16. A method as defined in claim 13, wherein the function is a continuous function.

17. A method as defined in claim 16, wherein said continuous function is a linear function.

18. A method as defined in claim 13, wherein said function is a monotonously falling function.

19. A method as defined in claim 12; and further comprising a value table in which a relationship between the input values and the output values is stored as at least one value table.

20. A method as defined in claim 12; and further comprising a storage in which a relationship between the input values and the output values is stored as at least one value table.

21. A method as defined in claim 12; and further comprising a storage in which a relationship between the input values and the output values is stored as at least one characteristic field.

22. A method as defined in claim 12; and further comprising a logic device in which a relationship between the input values and the output values is determined.

23. An electric tool, comprising a tool part; and a power control device including a control or regulating device for adjusting a power output to an electric motor of the electric tool by means of a pulse width modulation, and a frequency transmitter that varies a frequency of the pulse width modulation in dependence on a required power output, wherein as the required power output increases, the frequency of the pulse width modulation decreases and a ratio of the pulse width to a period of the pulses increases.

* * * * *